US007685047B2

(12) United States Patent
Coates (10) Patent No.: US 7,685,047 B2
(45) Date of Patent: *Mar. 23, 2010

(54) PORTABLE ALPHA-PLUS PRODUCTS HAVING A PRIVATE EQUITY COMPONENT

(75) Inventor: John S. Coates, Villanova, PA (US)

(73) Assignee: Morgan Stanley, New York, NY (US)

( * ) Notice: Subject to any disclaimer, the term of this patent is extended or adjusted under 35 U.S.C. 154(b) by 327 days.

This patent is subject to a terminal disclaimer.

(21) Appl. No.: 11/361,582

(22) Filed: Feb. 24, 2006

(65) Prior Publication Data

US 2006/0143105 A1   Jun. 29, 2006

Related U.S. Application Data

(63) Continuation-in-part of application No. 11/098,813, filed on Apr. 5, 2005.

(60) Provisional application No. 60/561,862, filed on Apr. 13, 2004.

(51) Int. Cl.
*G06Q 40/00* (2006.01)
(52) U.S. Cl. .................................... 705/36 R
(58) Field of Classification Search .............. 705/35
See application file for complete search history.

(56) References Cited

U.S. PATENT DOCUMENTS

| 6,049,772 | A  | * | 4/2000  | Payne et al. ................. 705/4 |
| 6,799,167 | B1 | * | 9/2004  | Gullen et al. ............. 705/36 R |
| 7,016,870 | B1 | * | 3/2006  | Jones et al. ................... 705/35 |
| 7,243,081 | B2 | * | 7/2007  | Friend et al. .................... 705/1 |
| 2003/0055765 | A1 | * | 3/2003  | Bernhardt ..................... 705/36 |
| 2004/0243499 | A1 | * | 12/2004 | Bateson et al. ................ 705/35 |
| 2006/0253360 | A1 | * | 11/2006 | Gould .......................... 705/35 |
| 2006/0271453 | A1 | * | 11/2006 | Landle et al. .................. 705/35 |
| 2007/0055598 | A1 | * | 3/2007  | Arnott et al. .................. 705/35 |
| 2007/0208643 | A1 | * | 9/2007  | Gauthereon et al. ....... 705/36 R |

OTHER PUBLICATIONS

Kung et al. Portable Alpha—Philosophy, Process & Performance, Spring 2004, Journal of Portfolio Management, pp. 1-14.*
Riley, B. An A-Z of Alpha and Beta. Financial Times.London (UK): Sep. 29, 2003. p. 28.*
Chernoff, J. Bernstein amends policy portfolio mantra, Sep. 1, 2003, Pensions & Investments, vol. 31, Issue 18, p. 3.*
Robert, Arnott D. Risk budgeting and portable alpha, Journal of Investing, Summer 2002, vol. 11, Issue 2, p. 15.*

(Continued)

*Primary Examiner*—Hani Kazimi
*Assistant Examiner*—Bijendra K Shrestha
(74) *Attorney, Agent, or Firm*—K&L Gates LLP (57) ABSTRACT

A financial product. The financial product includes a cash component, an alpha engine component, a private equity component and a beta component. The cash component includes an investment in a liquid portfolio. The alpha engine component includes an investment in an alpha-generating portfolio. The private equity component includes an investment in the private equity portfolio. The beta component is structured to track a total return of one or more indices.

18 Claims, 5 Drawing Sheets

OTHER PUBLICATIONS

Veith, Perry J. New horizons in bonds: Fixed income strategies reduce risk and increase returns, Canadian Investment Review, Toronto, Summer 2002, vol. 15, Issue 2, p. 45.*

Petzel, T., Portable alpha travels new road, Pensions & Investments. Chicago: Apr. 17, 2000. vol. 28, Issue 8, p. 40.*

Stanton, C., Investing in a low return environment: Suggestions for improving portfolio risk/reward potential, Senior Consultant, Jun. 2005, vol. 8, No. 7, pp. 1-6.*

Ruyter, T., Mixing alphas and betas, Global Finance, New York: Jul. 1998, vol. 12, Issue 7; p. 8.*

Kung et al. Portable Alpha—Philosophy, Process & Performance, Spring 2004, Journal of Portfolio Management, pp. 78-87.*

"Alpha Transport with Derivatives"—Bruce Jacobs et al., The Journal of Portfolio Management, May 1, 1999.

"Alpha Transport Strategies"—Nevin Adams, Plan Sponsor Magazine, Feb. 1997.

"Portable Alpha Overlay Via PanAgora's Fixed Income Active Core Strategy"—Edgar Peters et al., PanAgora Asset Management Brochure, 2002.

"Overlay Portfolio Management in a Multi-Manager Account"—David Stein et al., Journal of Wealth Management, Spring 2003.

"The Investment World is Changing"—Ray Dalio et al., Bridgewater Daily Observations, Apr. 25, 2003.

"The Flood into Hedge Funds"—Greg Jensen et al., Bridgewater Daily Observations, May 9, 2003.

"The New Investment Paradigm"—Ray Dalio, Institutional Investor, Jun. 2003.

"Hedge Funds Selling Beta as Alpha"—Greg Jensen et al., Bridgewater Daily Observations, Jun. 17, 2003.

"Post Modern Portfolio Theory—Engineering Targeted Returns and Risks"—Ray Dalio, Bridgewater Associates Brochure, 2003.

"Real Innovation—The future of pension fund investing rests with 'high-octane' specialists that plan executives will hire after first determining their risk budgets"—Joel Chernoff, Pensions & Investments, Oct. 27, 2003.

"A New Paradigm for Today's Challenges"—Bob Litterman, Goldman Sachs Brochure, 2003.

"Portable Alpha—Philosophy, Process & Performance"—Edward Kung et al., The Journal of Portfolio Management, Spring 2004.

"Separation Anxiety"—Andrew Capon, Institutional Investor, Dec. 2003.

"How Dalio's Bridgewater Wooed the Pension Funds"—Lain Jenkins, Absolute Return, vol. 2 Issue 1, Apr. 2004.

* cited by examiner

PORTABLE ALPHA-PLUS PRODUCTS HAVING A PRIVATE EQUITY COMPONENT

CROSS-REFERENCE TO RELATED APPLICATIONS

This application is a continuation-in-part of U.S. patent application Ser. No. 11/098,813, filed on Apr. 5, 2005, which claims the priority benefit of U.S. Provisional Application No. 60/561,862, filed on Apr. 13, 2004.

BACKGROUND

This application discloses an invention that is related, generally and in various embodiments, to enhanced financial methods, products, and systems for managing portfolios of fixed income, equity, or other investments.

Alpha refers to the deviation of the return that an active investment manager can generate compared with the passive return of the asset class exposures of the manager's portfolio. Beta refers to the portion of the return of a portfolio that can be attributed to the return of a relevant market benchmark. Beta essentially reflects the sensitivity of a portfolio to a move in the relevant market index. A portfolio may have multiple betas. In other words, a portfolio may have sensitivities to more than one market index. For a given portfolio, each beta exposure may be estimated using the following equation:

$$(R_P - R_F) = \text{alpha} + [\text{beta} \times (R_M - R_F)] + \text{a random error term}$$

where $R_P$ is the return of the portfolio during a period of time, $R_F$ is a risk free rate (e.g., Treasury bills), and $R_M$ is the return of the relevant market index.

For example, the alpha of an equity manager (e.g., stock manager) with a single S&P 500 beta of 1.0 would be the net return after fees of the manager's portfolio above or below the return of the S&P 500. The alpha of a fixed income manager (e.g., bond manager) with a single Lehman Aggregate Index beta of 1.0 would be the net return above or below the return of the Lehman Aggregate Index. For a portfolio with an S&P 500 beta of 0.50, net of any alpha or randomness, the return of the portfolio less the risk free rate would be expected to move by 50% as much as the percentage move of the S&P 500 above the risk free rate.

Portable alpha in the context of this application refers to a combination of an investment in a liquid portfolio, an investment in an alpha-generating portfolio, an investment in a private equity portfolio, and an investment in a benchmark portfolio, the combination of which is designed to generate fixed income, equity, or other beta exposures. This combination of investments is expected to generate higher average returns over time than would be expected from an investment only in a traditional fixed income, equity, or other portfolio having the same beta exposures.

A swap (e.g., total return swap) refers to a bilateral financial contract where an investor agrees to make payments (e.g., periodic payments), usually based on the London Inter-Bank Offered Rate ("LIBOR") plus some premium, to a counter-party in return for receiving the total economic performance of a specified asset at the end of the swap. The total economic performance generally is the sum of interest, dividends and other income and the change in value (i.e., appreciation or depreciation) of the underlying asset. A swap allows an investor to receive the economic exposure of asset ownership at a cost of only some premium above LIBOR without a substantial capital outlay. Swap counter-party risk (i.e., credit risk) can be limited by diversification with high quality counter-parties and by settling swaps prior to expiration if the accrued receivables from counter-parties become large.

Portfolios of certain types of alternative investments, such as a fund of funds (e.g., a low volatility fund of hedge funds), can generate high alpha with only small amounts of embedded fixed income, equity, and other beta exposures. Other types of alternative investments, such as a fund of private equity funds, can generate high alpha with larger amounts of embedded beta exposures.

After selecting asset classes an institutional investor often will seek traditional fixed income, equity, or other managers to generate excess returns from fixed income, equity, or other allocations. It is quite difficult, however, to find traditional investment managers who will significantly outperform applicable indices like, for example, the S&P 500 (equity) or various Lehman fixed income indices over long periods of time. Many traditional managers typically invest in very efficient markets, tend to have long-only securities, and tend to stay very close to their benchmark (i.e., tend to take limited active exposures). As such, there is limited opportunity to generate alpha.

Accordingly, there exists a need for enhanced financial methods, products, and systems for managing fixed income, equity, or other market portfolios that seek higher returns, and/or lower risk.

SUMMARY

In one general respect, this application discloses a financial product. According to various embodiments, the financial product includes a cash component, an alpha engine component, a private equity component, and a beta component. The cash component comprises an investment in a liquid portfolio. The alpha engine component comprises an investment in an alpha-generating portfolio. The private equity component comprises an investment in a private equity portfolio. The beta component is structured to track a total return of one or more indices.

In another general respect, this application discloses a financial system. According to various embodiments, the financial system includes a provider system configured to provide a financial product. The financial product includes a cash component, an alpha engine component, a private equity component, and a beta component. The cash component comprises an investment in a liquid portfolio. The alpha engine component comprises an investment in an alpha-generating portfolio. The private equity component comprises an investment in a private equity portfolio. The beta component is structured to track a total return of one or more indices.

In another general respect, this application discloses a method. The method comprises designing a financial product that includes a cash component, an alpha engine component, a private equity component, and a beta component. The cash component comprises an investment in a liquid portfolio. The alpha engine component comprises an investment in an alpha-generating portfolio. The private equity component comprises an investment in a private equity portfolio. The beta component is structured to track a total return of one or more indices.

Aspects of the disclosed invention may be implemented by a computer system and/or by a computer program stored on a computer readable medium. The computer readable medium may comprise a disk, a device, and/or a propagated signal.

Other features and advantages will be apparent from the following description, including the drawings, and from the claims.

DETAILED DESCRIPTION

The figures and descriptions of the disclosed invention have been simplified to illustrate elements that are relevant for a clear understanding of the disclosed invention. It should be understood that the methods, products, and systems described below may include various other processes, components, and elements in actual implementation.

Figure 1:
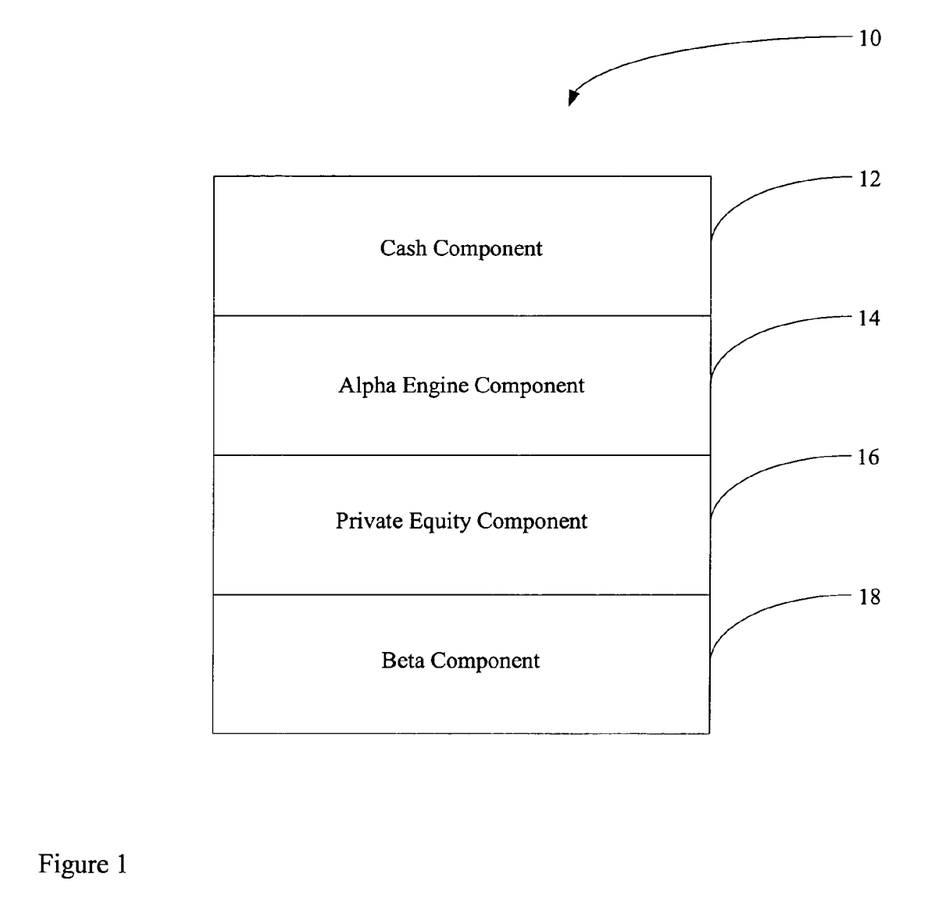
FIG. 1 illustrates various embodiments of a financial product.
Figure 2:
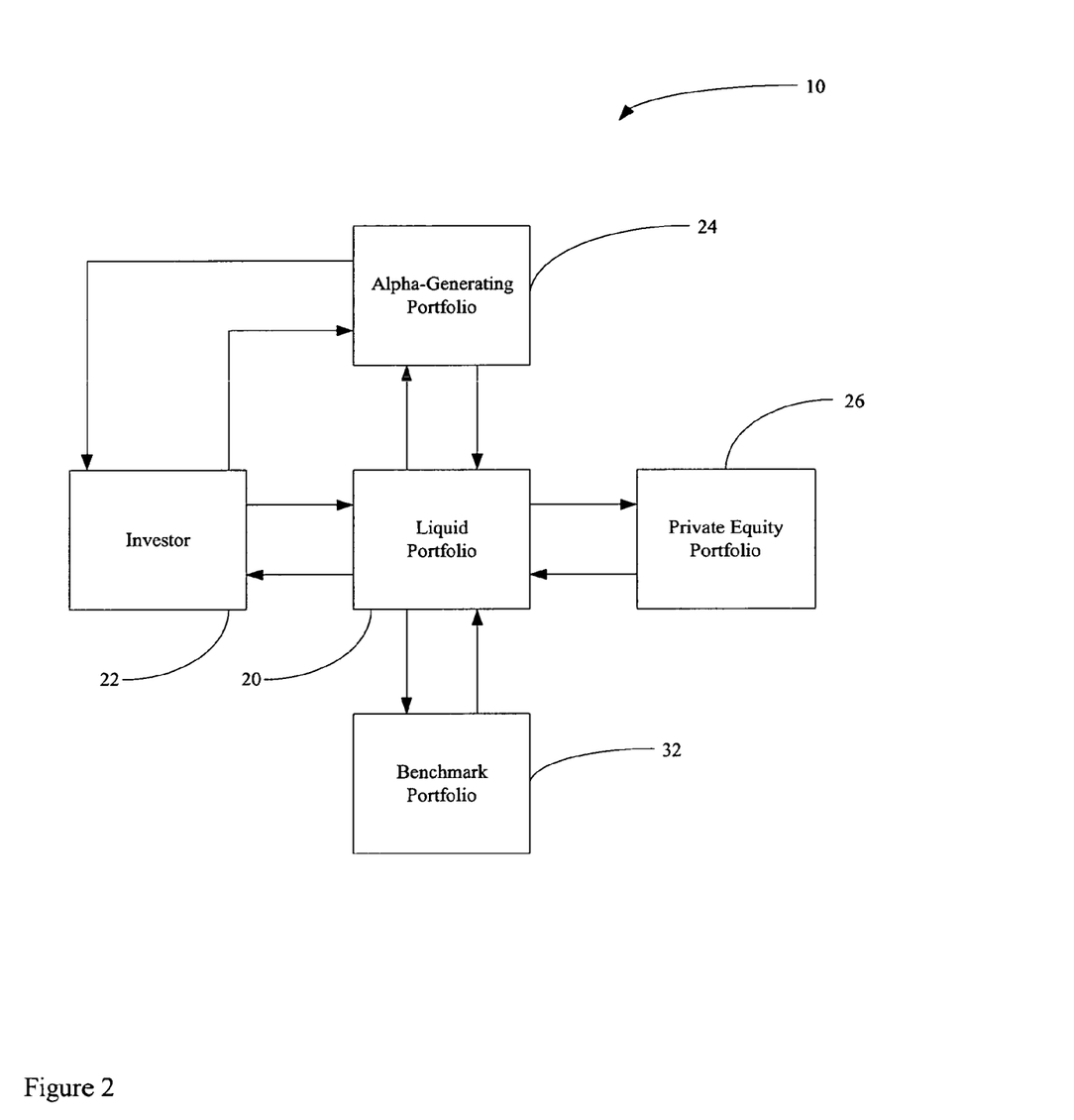
FIG. 2 illustrates various embodiments of a financial product.

FIGS. 1 and 2 illustrate various embodiments of a portable alpha-plus product 10. The portable alpha-plus product 10 ("the financial product") may be embodied as one or more paper and/or electronic documents and generally may contain one or more rights and obligations in the context of a financial transaction. As shown in FIG. 1, the financial product 10 includes a cash component 12, an alpha engine component 14, a private equity component 16, and a beta component 18.

In various embodiments, the cash component 12 comprises an investment in a liquid portfolio 20 (shown in FIG. 2). The liquid portfolio 20 may include a liquid account such as a cash account or a cash equivalent account (e.g., a bank account, a money market account, a cash management account, etc.). The investment in the liquid portfolio 20 may be implemented by a direct investment made by an investor 22 (shown in FIG. 2) or by a comingled product with multiple investors.

In various embodiments, the alpha engine component 14 is structured to generate excess returns over the passive return that would be expected for the amount of beta exposures, if any, embedded in the alpha engine component 14. The excess returns (alpha) can be transported to virtually any equity, fixed income or other benchmark (index) related to U.S. or non-U.S. markets, with foreign exchange exposure hedged to the extent appropriate for a particular situation.

In various implementations, the alpha engine component 14 comprises an investment (e.g., cash investment) in an alpha-generating portfolio 24 (shown in FIG. 2). The investment in the alpha-generating portfolio 24 may be implemented by a direct investment made by an investor 22 or by a comingled product with multiple investors. According to various embodiments, the investment in the alpha-generating portfolio 24 may be implemented with funds from the liquid portfolio 20. In other implementations, the alpha engine component 14 may comprise a derivative investment in an alpha-generating portfolio 24. According to various embodiments, the alpha engine component 14 may be pledged or otherwise used (e.g., a negative pledge agreement) to support a counterparty's credit assessment for the beta component 18. Funds from the liquid portfolio 20 may be used to facilitate settlement of various liabilities (e.g., fees, expenses, interest, etc.) associated with the alpha engine component 14.

The alpha-generating portfolio 24 may comprise a fund of funds such as, for example, a fund of hedge funds. For embodiments where the alpha engine component 14 comprises a direct investment in an alpha-generating fund of hedge funds, the fund of hedge funds may invest in a number of hedge funds employing a variety of strategies.

Figure 3:
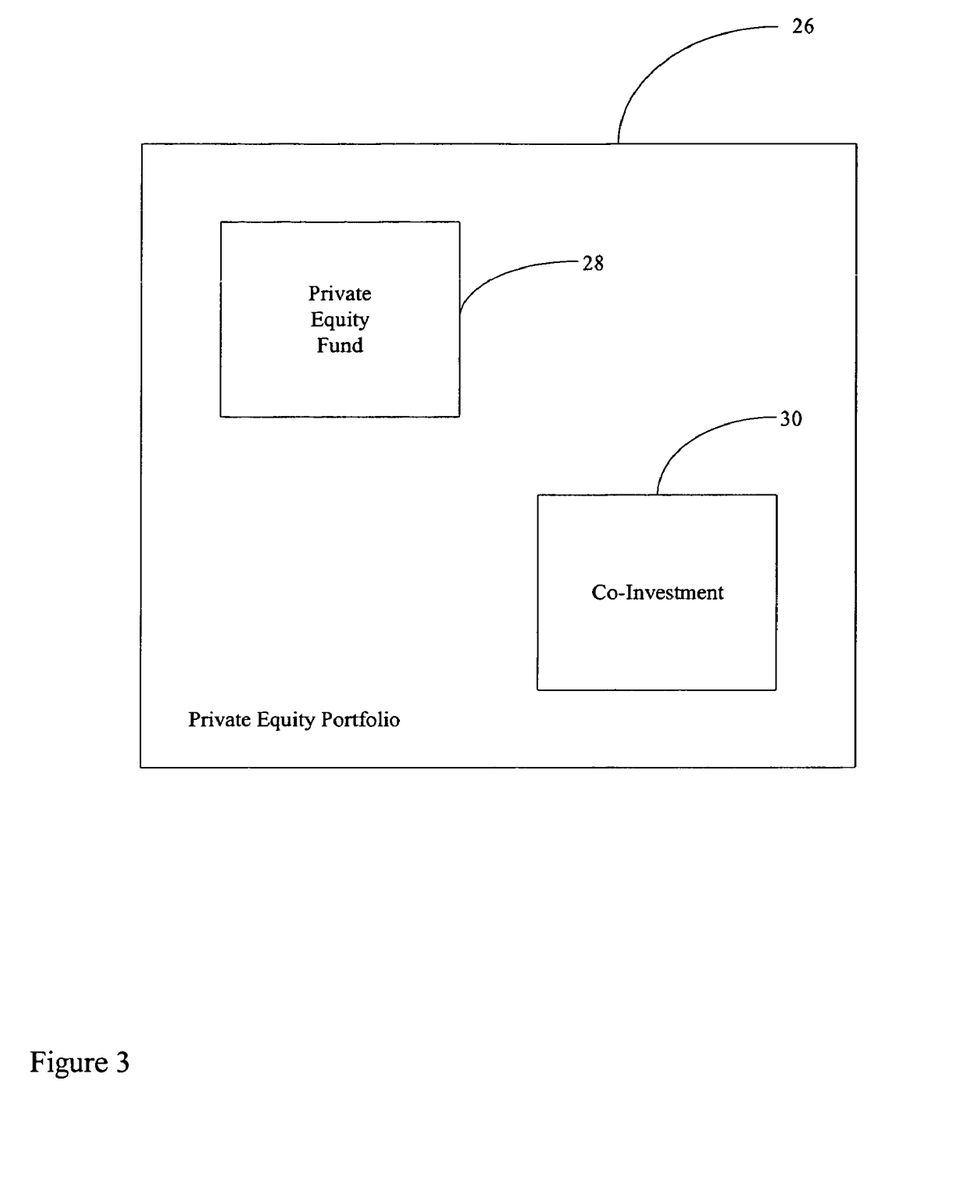
FIG. 3 illustrates various embodiments of a private equity portfolio.

In various embodiments, the private equity component 16 comprises an investment in a private equity portfolio 26 (shown in FIG. 2). According to various embodiments, the investment in the private equity portfolio 26 may be an investment from the liquid portfolio 20. According to other embodiments, the investment in the private equity portfolio 26 may be a direct investment from the investor 22 or from a comingled product with multiple investors. As shown in FIG. 3, the private equity portfolio 26 may comprise an investment in a private equity fund 28 and/or a co-investment 30 in a private deal. As used herein, a co-investment 30 refers to an individual investment in a single deal that a private equity fund is investing in. The private equity portfolio 26 may comprise any number of investments in any number of private equity funds 28 and/or any number of co-investments 30. According to various embodiments, the private equity portfolio 26 may comprise any number of investments in real estate, timber, oil, gas, etc.

The private equity funds 28 may be diversified across multiple strategies, managers, vintage years and geographic regions. Although private equity investments may require longer lock ups than public equity investments do, the targeted returns of private equity investments over the full investment cycle may be 6%-10% higher than the returns of public equity markets. Therefore, the private equity portfolio 26 may also be a source of significant alpha. The liquid portfolio 20 may provide the necessary funds as capital is called for the various private equity funds 28 or is needed to fund the various co-investments 30, and funds from the alpha-generating portfolio 24 may be used to replenish the liquid portfolio 20 as needed. As realizations occur in the private equity portfolio 26, funds may be transferred back to the liquid portfolio 20 and if adequate, may be used to increase the investment in the alpha-generating portfolio 24.

In various embodiments, the beta component 18 is structured to track the total return, including dividends and interest, of one or more indices. The indices may include a fixed income index, an equity index, or any other type of index.

In various implementations, the beta component 18 comprises a derivative investment in a benchmark portfolio 32 (shown in FIG. 2). The derivative investment may include at least one of the following: a swap, a futures contract, and an option. According to various embodiments, the derivative investment may include any combination of swaps, futures contracts, options and any other derivatives. The level of exposures in the benchmark portfolio 32 are set so that the sum of the beta exposures estimated to be in the alpha-generating portfolio 24, the private equity portfolio 26, and the benchmark portfolio 32 is approximately equal to the desired target aggregate exposures. Funds from the liquid portfolio 20 may be pledged as collateral for the beta component 18 and may be used to facilitate settlement of various liabilities (e.g., fees, expenses, interest, etc.) associated with the beta component 18.

In general, an investor 22 or a comingled product with multiple investors may initially make a relatively large investment (e.g., $100 million) in the liquid portfolio 20 associated with the cash component 12. The investment in the liquid portfolio 20 may be used to fund the alpha-generating portfolio 24 associated with the alpha engine component 14 with a relatively large portion of the initial investment (e.g., $80 million), leaving a relatively small portion of the initial investment (e.g., $20 million) in the liquid portfolio 20. Alternatively, in lieu of finding the alpha-generating portfolio 24 via the liquid portfolio 20, an investor 22 or a comingled product with multiple investors may initially invest the desired amounts directly into the liquid portfolio 20 and the alpha-generating portfolio 24. The liquid portfolio 20 may also be used to facilitate an exposure to the benchmark portfolio 32 associated with the beta component 18, where the beta component 18 comprises a swap, a futures contract, an option, or other derivative transaction with a third party (e.g., a swap counterparty). Such a third party may, for example, hedge its exposure by investing directly in the benchmark portfolio 32 or by otherwise entering into offsetting transactions. The return realized by the investor 22 is equal to the sum of the returns realized by the liquid portfolio 20, the alpha-generating portfolio 24, the private equity portfolio 26 and the benchmark portfolio 32 less the sum of the costs, fees and expenses, including those associated with the derivative transaction.

As described above, the financial product 10 may provide a custom tailored combination of fixed income, equity, and other securities that is able to meet the needs of a particular client.

Portable alpha can be used to transfer alpha and not undesired risk. In this respect, a find of hedge funds having low expected embedded fixed income, equity, or other beta exposures and volatility is particularly attractive for the alpha engine component 14. Other types of funds of hedge funds having wide variations in embedded beta exposures would be less suitable for transporting alpha to fixed income, equity, or other portfolios because it is difficult to determine, in advance, how much additional exposure is needed from the beta component 18 to achieve the desired aggregate target exposures. Total fixed income, equity, or other exposure with such finds of hedge funds might deviate unpredictably and in significant amounts from time to time, which could be problematic unless such deviations were desired as part of a market-timing strategy. In addition, as explained hereinabove, the private equity portfolio 26 may serve as an excellent source of alpha due to the relatively higher expected returns of the private equity funds 28 and co-investments 30, with the level of exposures in the benchmark portfolio 32 set so that the sum of the beta exposures estimated to be in the alpha-generating portfolio 24, the private equity portfolio 26, and the benchmark portfolio 32 is approximately equal to the desired target aggregate exposures.

Figure 4:
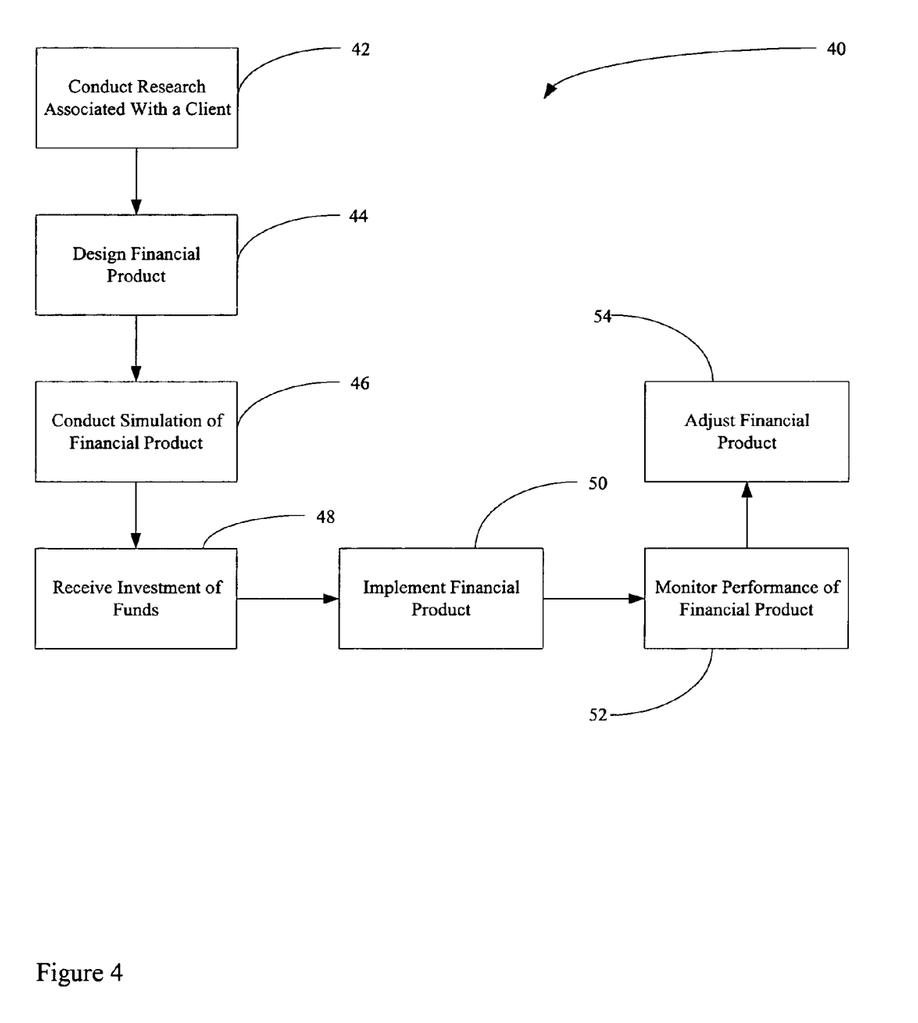
FIG. 4 illustrates various embodiments of a financial method.

FIG. 4 illustrates various embodiments of a financial method 40 for managing an investment portfolio. In various implementations, the financial method 40 may be implemented at least in part by hardware (e.g., device, computer, computer system, equipment, component); software (e.g., program, application, instruction set, code); storage medium (e.g., disk, device, propagated signal); or combination thereof. It should be noted, however, that the financial method 40 may be performed in any manner consistent with aspects of the disclosed invention. The hardware and software may be used to generate printed materials such as, for example, agreements, guidelines, regressions, scatter charts, etc. associated with the financial product 10.

At step 42, a provider conducts research to assess the current needs of a potential client. In various implementations, the provider may include, form part of, or be associated with, a financial services entity structured and arranged to provide financial services such as, for example, securities services and/or credit services. The potential client may be, include, form part of, or be associated with a current investor, investing entity, or other customer of the provider. The provider and the client may include or utilize various hardware, software, and/or storage mediums for providing and receiving financial services. In general, the provider solicits and receives information from the potential client in order to gain an understanding of their investment resources and investment objectives. The research conducted at step 42 may be conducted for any number of potential clients.

At step 44, the provider designs one or more financial products 10 based upon the information received from potential clients. In various embodiments, the financial product 10 is designed to include the cash component 12, the alpha engine component 14, the private equity component 16 and the beta component 18. Although the specific investments associated with the cash component 12, the alpha engine component 14, the private equity component 16, and the beta component 18 may not be known at this point, the general guidelines and parameters for selecting such investments may be incorporated in the design of the financial product 10. In general, the provider uses the potential client information to design one or more potential financial products 10 believed to satisfy the needs and expectations of the potential client. The information from a potential client or group of potential clients may be used, for example, to tailor the allocation of assets within the financial product 10. For instance, client information such as accounting concerns for pension funds, tax considerations for endowments and foundations, non-U.S. liabilities, foreign exchange considerations, and preferences and risk tolerances of clients may impact the allocation of the cash component 12, the alpha engine component 14, the private equity component 16 and the beta component 18 within the financial product 10. The provider may design any number of financial products 10 at step 44.

At step 46, the provider conducts one or more simulations of the designed financial products 10. In general, the provider conducts simulations to illustrate expected return scenarios, liabilities and/or spending concerns. The simulations may determine the characteristics, the long-term expected return, the volatility, the skewness (asymmetry), and/or kurtosis (fat-tails in the distribution of returns) for the various financial products 10. The provider may conduct any number of simulations at step 46.

At step 48, the provider receives an investment from a client (e.g., investor 22). In general, based on the simulations, the client makes an informed selection of a particular financial product 10 before investing with the provider. The provider may receive any number of investments from any number of clients at step 48.

At step 50, the provider implements the financial product 10. In general, the provider implements the financial product 10 by initially having the client make a direct investment in the liquid portfolio 20. Funds from the liquid portfolio 20 may then be used by the provider to make an investment in the alpha-generating portfolio 24 and one or more derivative investments in the benchmark portfolio 32. When the provider identifies private equity investment opportunities (e.g., a private equity fund 28 and/or a co-investment 30) that meet the general guidelines and parameters established at step 44, funds from the liquid portfolio 20 may be used by the provider to invest in the private equity fund 28 and/or the co-investment 30. The provider may utilize funds from the liquid portfolio 20 to invest in any number of private investment opportunities. The provider may also implement the financial product 10 by initially having the client make a direct or derivative investment in some combination of the cash component 12, the alpha engine component 14, the private equity component 16, and the beta component 18. The provider may implement any number of financial products at step 50.

The specific needs of a particular client may determine the particular mix of investments made to implement the financial product 10. The investments may be allocated such that the aggregate of the beta characteristics embedded in the various portfolios together is approximately equal to the target characteristics specified by the client. The embedded beta characteristics of the various portfolios are determined using one or more experienced-based judgment and linear regressions, multiple regressions, stepwise regressions and downside regressions of historical monthly returns of portfolios similar to the alpha engine component 14 and the private equity component 16 on the fixed income, equity, or other index associated with the beta component 18. Other quantitative and qualitative techniques well known to those skilled in the art (e.g., factor analysis) may also be used to estimate the embedded exposures in the alpha engine component 14, the private equity component 16 and the beta component 18.

Many combinations and permutations can be used to implement the financial product 10. The actual mix of the alpha-generating portfolio 24 associated with the alpha engine component 12, the private equity portfolio 26 associated with the private equity component 16, and the benchmark portfolio 32 (e.g., fixed income, equity, or other portfolio) associated with the beta component 18 may be tailored to the specific needs of the client and, in addition, can be implemented in a number of different ways.

At step 52, the provider monitors performance of the financial product 10. In general, the financial product 10 is monitored over time as market conditions change. In various implementations, the provider monitors the interrelationships among the components and the returns developed in each component. The provider may monitor the performance of any number of financial products 10 at step 52.

At step 54, the provider provides adjustments to the financial product 10. In general, the provider may utilize funds from the liquid portfolio 20 to invest in additional private investment opportunities. The provider may also provide periodic rebalancing and other necessary adjustments based on the interrelationships among the components and the returns developed in each component. The provider may provide any number of adjustments to any number of financial products 10 at step 54. For example, in addition to rebalancing, adjustments may be necessary in the case of an investment strategy change within the alpha-generating portfolio 24 or in the case of changes in betas embedded in the alpha-generating portfolio 24 or the private equity portfolio 26.

Figure 5:
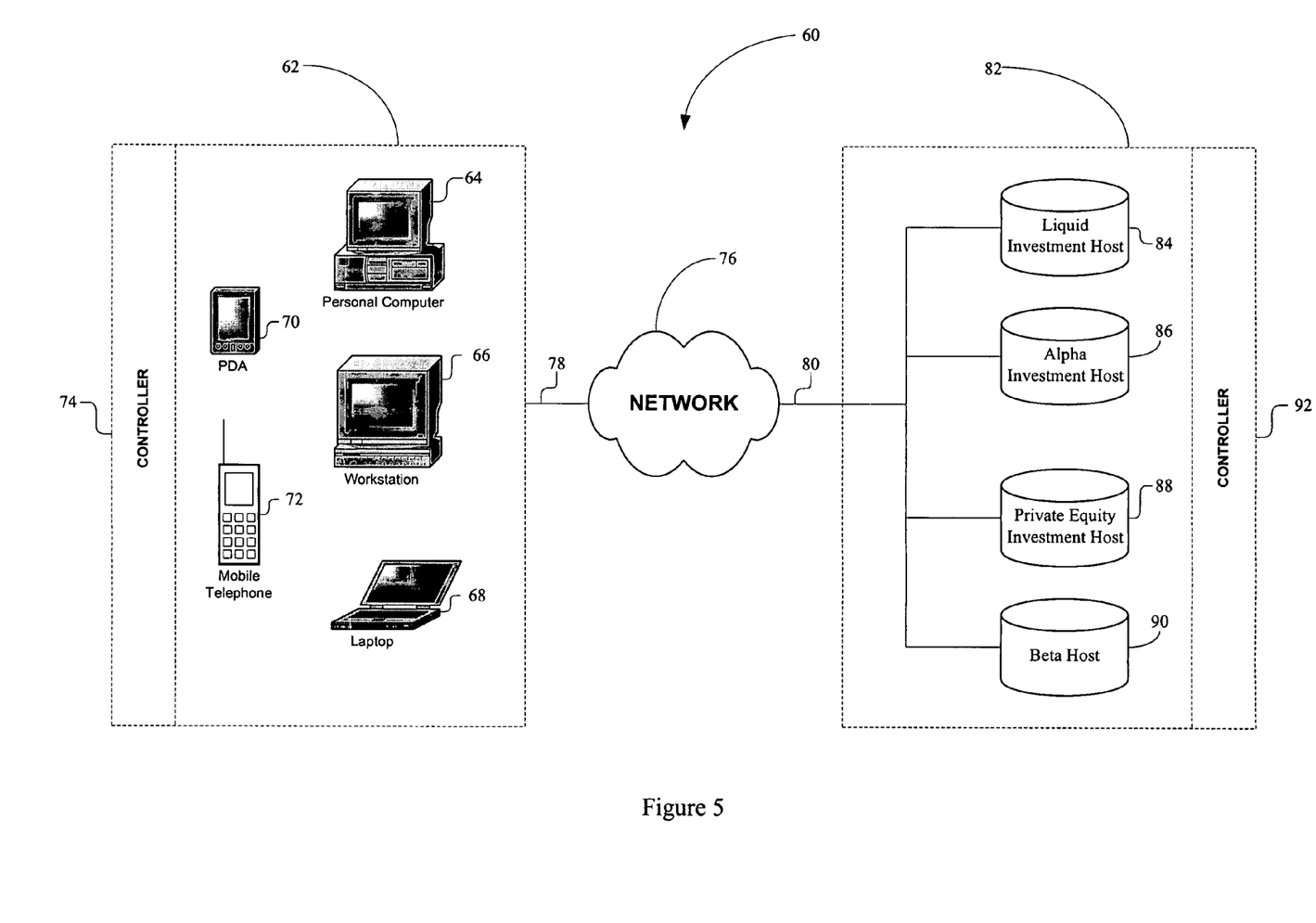
FIG. 5 illustrates various embodiments of a financial system.

FIG. 5 illustrates various embodiments of a financial system 60. In general, one or more elements of the financial system 60 may perform the method 40 and/or may implement the financial product 10, as described above.

As shown, the financial system 60 includes a client system 62 for presenting information to, and receiving information from, a user. The client system 62 may include one or more client devices such as, for example, a personal computer (PC) 64, a workstation 66, a laptop computer 68, a network-enabled personal digital assistant (PDA) 70, and a network-enabled mobile telephone 72. Other examples of a client device include, but are not limited to, a server, a microprocessor, an integrated circuit, fax machine or any other component, machine, tool, equipment, or some combination thereof capable of responding to and executing instructions and/or using data.

In various implementations, the client system 62 operates under the command of a client controller 74. The broken lines are intended to indicate that in some implementations, the client controller 74, or portions thereof considered collectively, may instruct one or more elements of the client system 62 to operate as described. Examples of a client controller 74 include, but are not limited to a computer program, a software application, computer code, set of instructions, plug-in, applet, microprocessor, virtual machine, device, or combination thereof, for independently or collectively instructing one or more client devices to interact and operate as programmed.

The client controller 74 may be implemented utilizing any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The client controller 74 (e.g., software application, computer program) may be stored on a computer-readable medium (e.g., disk, device, and/or propagated signal) such that when a computer reads the medium, the functions described herein are performed.

In general, the client system 62 may be connected through a network 76 having wired or wireless data pathways 78, 80 to provider system 82. The network 76 may include any type of delivery system including, but not limited to, a local area network (e.g., Ethernet), a wide area network (e.g. the Internet and/or World Wide Web), a telephone network (e.g., analog, digital, wired, wireless, PSTN, ISDN, GSM, GPRS, and/or XDSL), a packet-switched network, a radio network, a television network, a cable network, a satellite network, and/or any other wired or wireless communications network configured to carry data. The network 66 may include elements, such as, for example, intermediate nodes, proxy servers, routers, switches, and adapters configured to direct and/or deliver data.

In general, the client system 62 and the provider system 82 each include hardware and/or software components for communicating with the network 76 and with each other. The client system 72 and provider system 82 may be structured and arranged to communicate through the network 76 using various communication protocols (e.g., HTTP, TCP/IP, UDP, WAP, WiFi, Bluetooth) and/or to operate within or in concert with one or more other communications systems.

The provider system 82 is configured to provide the financial product 10 and generally hosts a set of resources for a group of users. As shown, the provider system 82 may include a liquid investment host 84, an alpha investment host 86, a private equity investment host 88 and a beta host 90. In various embodiments, the hosts 84-90 are in communication with each other and are configured to collaborate in investment research, market research, product design, staffing, trading, controls, monitoring, marketing and client service.

In various implementations, the liquid investment host 84 is configured to provide the cash component 12. The liquid investment host 84 may implement and manage the cash component 12, and may be configured to select from a wide variety of cash accounts and cash equivalent accounts. The liquid investment host 84 may interact with the provider system 82 for managing capital calls, co-investments, cash settlements to swap counter-parties, futures margin flows, and other cash settlement requirements.

In various implementations, the alpha investment host 86 is configured to provide the alpha engine component 14. The alpha investment host 86 may implement and manage the alpha engine component 14. The alpha investment host 86 may advise the beta host 90 of estimates of beta exposures, if any, embedded in the alpha-generating portfolio 24 associated with the alpha engine component 14 so that appropriate adjustments in the various benchmark portfolios 32 associated with the beta component 18 can be made.

In various implementations, the private equity investment host 88 is configured to provide the private equity component 16. The private equity host 88 may implement and manage the private equity component 16. The private equity host 88 may advise the beta host 90 of estimates of beta exposures, if any, embedded in the private equity portfolio 26 associated with the private equity component 16 so that appropriate adjustments in the various benchmark portfolios 32 associated with the beta component 18 can be made. The private equity investment host 88 may interact with the liquid investment host 84 to carry out private equity investments associated with the private equity component 16.

In various implementations, the beta host 90 is configured to provide the beta component 18. The beta host 90 may implement and manage the beta component 18. The beta host 90 may tailor securities portfolios for clients, and may be configured to select from a wide variety of instruments, including without limitation futures, options and swaps. In various embodiments, the liquid investment host 84, the alpha investment host 86, the private equity investment host 88 and the beta host 90 are configured to be jointly responsible for client reporting and for making exposure adjustments from time to time as alpha is generated and/or embedded betas change and/or as the client's total fund asset mix drifts.

Each of the hosts 84-90 may be implemented by one or more servers (e.g., IBM® OS/390 operating system servers, Linux operating system-based servers, Windows NT™ servers) providing one or more assets (e.g., storage arrays, applications) to the group of users. According to various embodiments, the hosts 84-90 may be combined into a single host.

In various implementations, the provider system 82 operates under the command of a provider controller 92. The broken lines are intended to indicate that in some implementations, the provider controller 92, or portions thereof considered collectively, may instruct one or more elements of provider system 82 to operate as described. Examples of a provider controller 92 include, but are not limited to, a computer program, a software application, computer code, set of instructions, plug-in, microprocessor, virtual machine, device, or combination thereof, for independently or collectively instructing one or more computing devices to interact and operate as programmed.

In general, provider controller 92 may be implemented utilizing any suitable algorithms and computing language (e.g., C, C++, Java, JavaScript, Perl, Visual Basic, VBScript, Delphi) and may be embodied permanently or temporarily in any type of computer, computer system, device, machine, component, physical or virtual equipment, storage medium, or propagated signal capable of delivering instructions. The provider controller 92 when implemented as software or a computer program, for example, may be stored on a computer-readable medium (e.g., device, disk, or propagated signal) such that when a computer reads the medium, the functions described herein are performed.

The benefits of the disclosed methods, systems and computer-readable media are readily apparent to those skilled in the art. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves. The various portions and components of various embodiments of the disclosed invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the disclosed invention. Therefore, this application is intended to cover all such modifications, alterations and adaptations without departing from the scope and spirit of the disclosed invention as defined by the appended claims.

What is claimed is:

1. A method for investing funds of an investor, the method comprising:

conducting, by a computer system, a number of computer-implemented simulations to determine return characteristics for potential investments of the funds, wherein the return characteristics comprise expected returns and at least one distribution characteristic of the expected returns for the potential investments, wherein the computer system comprises a processor and computer readable medium, and is programmed to perform the simulations;

investing the funds of the investor in a portable-alpha investment that comprises:

investing a first portion of the funds in an alpha-generating portfolio based on the computer-implemented simulations, wherein the alpha-generating portfolio is a portfolio for generating a return, a portion of which comprises an alpha return portion that is a return over a passive return of a benchmark, and wherein the alpha-generating portfolio comprises at least one private equity investment and at least one non-private equity investment;

estimating one or more first embedded beta exposures of the alpha-generating portfolio using one or more computer-implemented quantitative analyses, wherein the computer-implemented quantitative analyses are performed by the computer system, wherein the computer system is programmed to perform the one or more quantitative analyses;

making one or more derivative investments in a benchmark portfolio, wherein the one or more derivative investments generate one or more second embedded beta exposures; and wherein the investments in the alpha-generating portfolio and the benchmark portfolio are allocated such that the sum of the one or more first embedded beta exposures and the one or more second embedded beta exposures approximates a target aggregate exposure of the investor.

2. The method of claim 1, wherein the benchmark portfolio tracks one or more indices.

3. The method of claim 1, wherein the alpha-generating portfolio comprises a fund of funds.

4. The method of claim 1, wherein the non-private equity investment comprises an investment in a fund of hedge funds.

5. The method of claim 1, wherein the at least one private equity investment comprises an investment in a private equity fund.

6. The method of claim 1, wherein the at least one private equity investment comprises a co-investment in a private deal.

7. The method of claim 1, wherein the at least one private equity investment comprises an investment in a private equity fund and comprises a co-investment in a private deal.

8. The method of claim 1, wherein investing the funds of the investor in a portable-alpha investment further comprises investing a second portion of the funds in a liquid portfolio.

9. The method of claim 8, further comprising pledging a portion of the liquid portfolio as collateral for the one or more derivative investments.

10. The method of claim 8, wherein a portion of the liquid portfolio is used to fund capital calls for the at least one private equity investment.

11. The method of claim 2, wherein the alpha-generating portfolio comprises a fund of funds.

12. The method of claim 11, wherein the at least one private equity investment comprises at least one of an investment in a private equity fund and a co-investment in a private deal.

13. The method of claim 1, wherein making the one or more derivative investments in the benchmark portfolio comprises entering into one or more derivative contracts, wherein the one or more derivative contracts are selected from the group consisting of swaps, futures, and options.

14. The method of claim 1, where the one or more quantitative analyses comprise at least one regression.

15. The method of claim 1, wherein estimating the one or more first embedded beta exposures of the alpha-generating portfolio comprises performing one or more computer-implemented regressions of a return of the alpha-generating portfolio on one or more indices.

16. The method of claim 14, wherein the at least one regression comprises a regression selected from the group consisting of a ~linear regression, a multiple regression, and a downside regression.

17. The method of claim 1, wherein the computer system comprises a personal computer.

18. The method of claim 1, wherein the computer system comprises a server.

* * * * *

UNITED STATES PATENT AND TRADEMARK OFFICE
CERTIFICATE OF CORRECTION

PATENT NO. : 7,685,047 B2  Page 1 of 1
APPLICATION NO. : 11/361582
DATED : March 23, 2010
INVENTOR(S) : John S. Coates It is certified that error appears in the above-identified patent and that said Letters Patent is hereby corrected as shown below:

Claim 16:

Col. 12, Line 10, delete "consisting of a ~linear regression," and substitute therefor --consisting of a linear regression,--.

Signed and Sealed this

Twenty-second Day of June, 2010

David J. Kappos
*Director of the United States Patent and Trademark Office*